United States Patent
Vu et al.

(10) Patent No.: US 6,794,074 B2
(45) Date of Patent: Sep. 21, 2004

(54) AIR MANAGER FOR METAL-AIR CELLS

(75) Inventors: Viet H. Vu, Verona, WI (US); Paul G. Cheeseman, Verona, WI (US); Marc L. Syvertsen, Madison, WI (US); John A. Thompson, Peachtree City, GA (US); Christopher S. Pedicini, Roswell, GA (US); John D. Witzigreuter, Kennesan, GA (US)

(73) Assignee: Rayovac Corporation, Madison, WI (US)

( * ) Notice: Subject to any disclaimer, the term of this patent is extended or adjusted under 35 U.S.C. 154(b) by 397 days.

(21) Appl. No.: 09/976,119

(22) Filed: Oct. 12, 2001

(65) Prior Publication Data

US 2002/0061427 A1 May 23, 2002

Related U.S. Application Data

(60) Provisional application No. 60/239,706, filed on Oct. 12, 2000.

(51) Int. Cl.[7] .......................... H01M 2/12; H01M 12/06
(52) U.S. Cl. .............................. 429/27; 429/13; 429/34; 429/71; 429/120
(58) Field of Search .............................. 429/13, 26, 27, 429/34, 71, 83, 120, 164

(56) References Cited

U.S. PATENT DOCUMENTS

| | | |
|---|---|---|
| 4,354,958 A | 10/1982 | Solomon |
| 4,444,852 A | 4/1984 | Liu et al. |
| 4,518,705 A | 5/1985 | Solomon et al. |
| 4,615,954 A | 10/1986 | Solomon et al. |
| 4,913,983 A | 4/1990 | Cheiky |
| 4,927,514 A | 5/1990 | Solomon et al. |
| 4,997,731 A * | 3/1991 | Machida et al. ............. 429/90 |
| 5,354,625 A | 10/1994 | Bentz et al. |
| 5,356,729 A | 10/1994 | Pedicini |
| 5,536,590 A | 7/1996 | Cheiky |
| 5,560,999 A | 10/1996 | Pedicini et al. |
| 5,571,630 A | 11/1996 | Cheiky |
| 5,721,064 A | 2/1998 | Pedicini et al. |
| 5,919,582 A | 7/1999 | Pedicini et al. |
| 6,106,962 A | 8/2000 | Pedicini et al. |
| 6,168,877 B1 | 1/2001 | Pedicini et al. |
| 6,197,445 B1 | 3/2001 | Ward et al. |
| 6,342,314 B1 * | 1/2002 | Sieminski et al. ............. 429/13 |

FOREIGN PATENT DOCUMENTS

WO    WO 01/22522 A1    3/2001

OTHER PUBLICATIONS

Panasonic, Manganese Dioxide (CR Series) Lithium Batteries, Lithium Primary, 1999.

* cited by examiner

Primary Examiner—Gregg Cantelmo
(74) Attorney, Agent, or Firm—Quarles & Brady, LLP

(57) ABSTRACT

An air manager is provided for supplying air to a battery that may be disposed in a battery compartment of an electrical device. The battery includes at least one air-depolarized cell to supply power to the device. The air manager achieves a dual function of stimulating flow within the battery compartment as well as delivering air over the at least one cell. In particular, the air entering the air manager is split into two streams, the first stream delivering air to the cell, and the second stream stimulating flow within the battery compartment. The air manager may use a fan, peristaltic air pump, or any alternative air mover. The battery may have a "Figure-8" design to provide adjacent cell compartments that are received in a battery compartment configured to receive standard size alkaline cells.

55 Claims, 12 Drawing Sheets

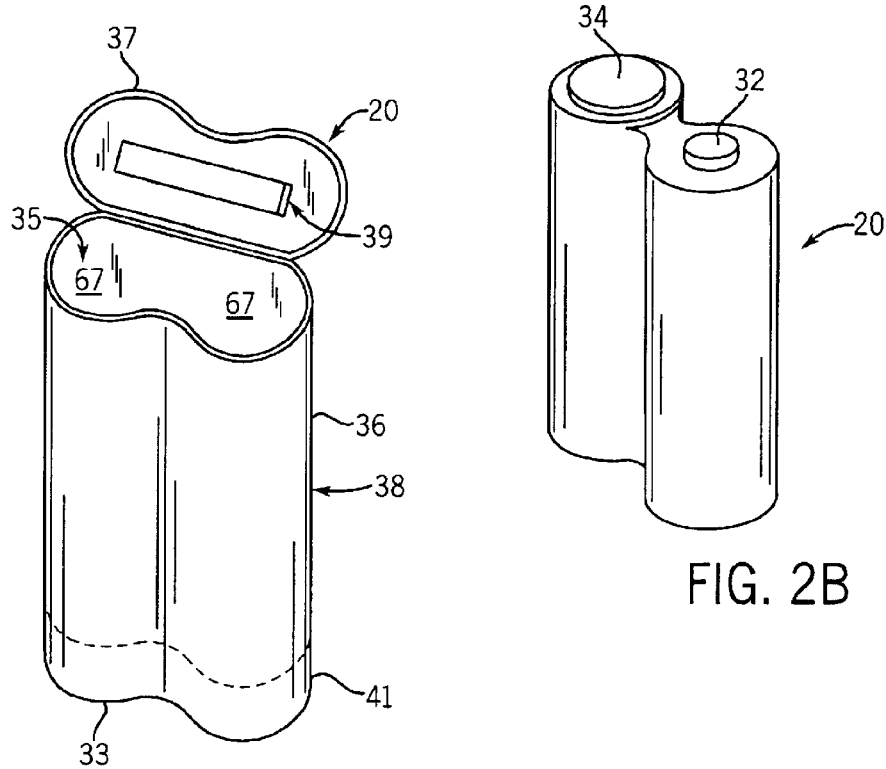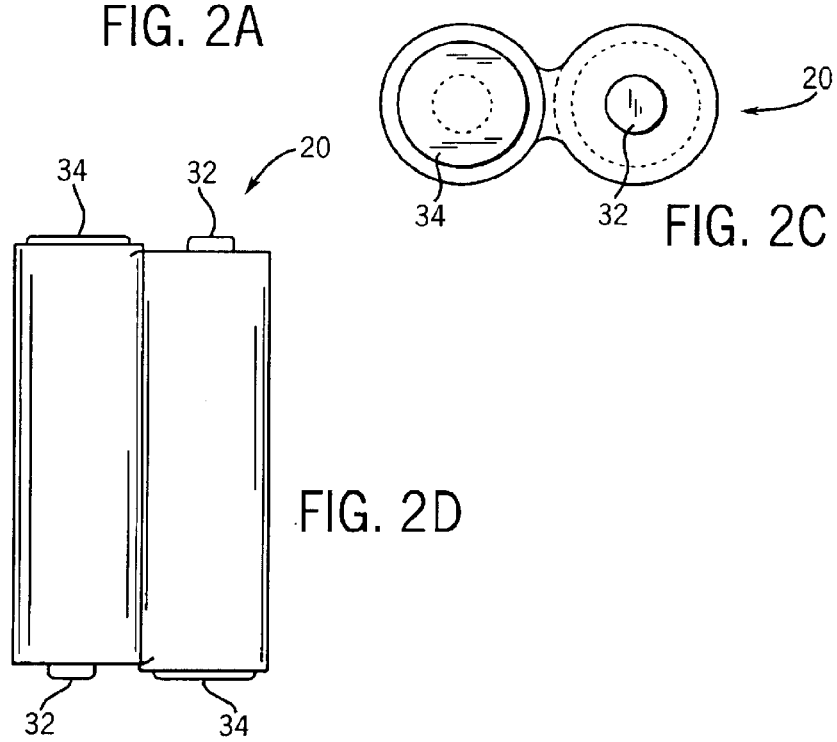

AIR MANAGER FOR METAL-AIR CELLS

CROSS-REFERENCE TO RELATED APPLICATIONS

The present application claims priority to U.S. Patent application No. 60/239,706, filed on Oct. 12, 2000 and entitled "Battery Cartridge for Electronic Device" the disclosure of which is hereby incorporated by reference as if set forth in its entirety herein.

STATEMENT REGARDING FEDERALLY SPONSORED RESEARCH OR DEVELOPMENT

Not Applicable.

BACKGROUND OF THE INVENTION

The present invention relates to air-depolarized power sources having an electrode such as metal-air battery cells and, in particular, relates to an improved method and apparatus for providing an adequate supply of oxygen to air-depolarized cells.

The vast majority of portable electronic devices can be battery operated. The battery or batteries required to operate such devices are typically inserted into a cavity within the device or are attached to an external surface of the device. Of greatest interest in the marketplace today are so-called high current drain portable consumer electronic devices such as cell phones, digital cameras, flash cameras, computers, personal digital assistants, cassette players and compact disc players. In many instances, such devices accept alkaline batteries. However, alkaline batteries are not necessarily efficient energy sources for such devices since the energy available from alkaline batteries decreases as the rate of current drain increases. It thus became advantageous to provide an alternative energy source for such devices. The ability to do so was constrained by the existing cavity or surface configurations which are typically sized for a predetermined number of cylindrical alkaline cells.

Metal-air battery cells were introduced as an improved alternative to alkaline cells for use in a portable electronic device while providing an energy source more appropriate to the high current drain conditions associated with such devices. FIG. 1 depicts the available energy of AA premium alkaline and AA zinc-air cells at various power draws. It is apparent from FIG. 1 that the energy available in the typical power ranges of 100 mW to 1000 mW is much greater in zinc-air cells than in alkaline cells. Accordingly, it is desirable to substitute zinc-air cells in place of standard alkaline cells. For example, a pair of AA alkaline cells in a digital camera have an expected operating life of less than ½ hour. In contrast, zinc-air cells in a digital camera can provide several hours of operation, and can be readily be replaced by the user when discharged.

Metal-air cells include an air permeable cathode and a metallic anode separated by an aqueous electrolyte. For example, in a zinc-air battery, the anode contains zinc, and during discharge, oxygen from the ambient air and water from the electrolyte is converted at the cathode to hydroxide, zinc is oxidized at the anode by the hydroxide, and water and electrons are released to provide electrical energy. Metal-air batteries have a relatively high energy density because the cathode of a metal-air battery utilizes oxygen from ambient air as a reactant in the electrochemical reaction rather than a heavier material such as a metal or metallic composition. Metal-air battery cells are often arranged in multiple cell battery packs within a common housing to provide a sufficient amount of power output. The result is a relatively lightweight battery.

Both primary and secondary metal-air batteries have been developed. A rechargeable metal-air battery is recharged by applying voltage between the anode and cathode of the metal-air battery cell and reversing the electrochemical reaction. Oxygen is discharged into the atmosphere through the air permeable cathode.

One difficulty associated with metal air batteries is that the ambient humidity level can cause the metal-air battery to fail. Equilibrium vapor pressure of the metal-air battery results in an equilibrium relative humidity that is typically about 45%. If ambient humidity is greater than the equilibrium relative humidity value for the metal-air battery, the metal-air battery will absorb water from the air through the cathode and fail due to a condition called flooding, which may cause the battery to leak. If the ambient humidity is less than the equilibrium relative humidity value for the metal-air battery, the metal-air battery will release water vapor from the electrolyte through the air cathode and fail due to drying out. In most environments where a metal-air battery is used, failure occurs from drying out.

The problems caused by ambient humidity are exacerbated in air depolarized cells because the oxygen diffusion electrode (cathode) typically passes water vapor as freely as oxygen due to the similar size and polarization of gaseous water molecules. Thus, as air is supplied to such batteries on discharge, or vented on recharge (in the case of rechargeable batteries), water vapor freely passes through the cathode as well.

Therefore, the art has recognized that an imbalance between the humidity level in the air passing over the air cathode and the humidity level within the cell creates a net transfer of water into or out of the cell, and may lead to the problems outlined above. Furthermore, such problems become more serious when large quantities of new ambient air continuously flow over the cathode.

Another problem associated with supplying a metal-air cell with continuous supplies of fresh air is the transfer of carbon dioxide into the cell, which neutralizes the electrolyte such as potassium hydroxide.

In order to make such cells more useful over longer periods of time, air managers have been developed, which isolate the cells from the environment when they are not in use, but provide air when needed. The system disclosed in U.S. Pat. No. 4,913,983 encloses metal air cells in a housing having an air inlet and outlet. A baffle within the battery housing is used to open or close the air inlet and outlet, limiting air access when the cells are not in use. The system also has a fan to supply a greater flow of ambient air to the cells when needed. This arrangement achieves a continuous flow of new ambient air across the air cathodes at a flow rate sufficient to achieve the desired power output. More advanced air managers have been developed which also include a cell enclosure, and an air mover, such as a fan, but use diffusion tubes rather than a closable baffle to isolate the cells from the environment. In particular, the cell receives open air through the diffusion tubes, which limit the amount of fresh air reaching the cell when it is not in use sufficiently to reduce dryout or flooding, and carbon dioxide absorption, which would further reduce the cell capacity. When the cell is in use, the air mover forces air through the diffusion tubes, bringing fresh air through the enclosure.

Examples of such air manager are disclosed in U.S. Pat. Nos. 5,356,729, 5,560,999, and 5,919,582, the disclosure of each of which is hereby incorporated as if set forth in its entirety herein. In the '729 patent, a housing is typically provided that encloses at least one metal-air cell having at least one ventilation opening that is sized to preferentially diffuse oxygen into the housing upon reduction of the oxygen concentration within the housing caused by operation of the cell or cells. A fan is positioned to circulate and mix gases which are present within the housing. Accordingly, the need of the cell for oxygen is met while maintaining a more stable water vapor and carbon dioxide equilibrium across the air cathode.

The purpose of previous air managers thus has been to isolate the cells from the environment, extending the usable life of the cells. The air manager disclosed in the '729 patent is designed to be used in either open air or in places (such as battery compartments of some electronic devices) where there would be enough fresh air circulation for a metal-air cell to be used at the desired rate without using an air manager. In particular, the air manager is able to only move air within the air manager's internal housing, but can not influence the freshness of the air surrounding the air manager because of the relatively low air flow rate. Accordingly, when the metal-air cell is used inside a battery compartment where an insufficient amount of oxygen is present to support the operation of the cell at the desired rate, the air flow described in the '729 patent would be insufficient. The cell would thus eventually starve for oxygen, thus significantly reducing the energy output during operation.

One solution would be to move a larger quantity of air through the air manager, over the cells, and through the battery compartment. While this would provide enough oxygen for the cells to operate at the desired rate, the cells would dry out prematurely or flood due to the high air flow rate. Furthermore, most electrical devices demand varying amounts of power during operation, depending on the function being performed. If the air manager is configured to supply a constant flow of oxygen to the cathode sufficient to operate the device at its highest power level, the air supply will cause excessive environmental exposure for the zinc air cell causing premature failure when, for example, the device demands only a fraction of the maximum power. Moreover, large power demands are placed on the cell for operating the fan unnecessarily at high speeds.

While conventional air managers are effective in achieving the function of circulating air that is disposed in the battery compartment throughout the battery to stimulate the cell, they are ineffective at providing fresh air to the cell when the battery is installed in a location having restricted access with respect to the ambient environment. Otherwise stated, conventional air managers do not add to the operability of a cell that would be otherwise inoperable when disposed in a battery compartment where fresh air is not abundantly available. This is primarily because conventional air managers are designed to operate in environments having direct access to the fresh air of the ambient environment. For example, traditional cellular phone and camcorder batteries have surfaces in communication with the ambient air where air inlets and outlets are located. As a result, conventional air managers, which produce an air flow between 4 and 6 times more than the flow needed by the cathode for stoichiometric operation of the cells, are able to draw sufficient fresh air in these "open" environments to maintain a sufficient oxygen concentration at the cathode. However, research has indicated that a greater flow rate is necessary when the battery compartment is not open, but rather receives air from the ambient environment indirectly (e.g. via relatively small leaks in the compartment). However, as noted above, if conventional air managers are modified to produce a greater flow rate, the life of the battery will be significantly reduced.

What is therefore needed is an air manager for a metal-air cell that enables fresh air to circulate throughout the cell when installed in compartments having a limited oxygen supply, and that supplies only the necessary amount of oxygen to the cells to increase the life span of the battery.

BRIEF SUMMARY OF THE INVENTION

In one aspect the invention provides a battery that is configured to be installed in a battery compartment of an electrical device. The battery has at least one air-depolarized cell to supply power to the device. The battery includes a housing that defines a cell cavity containing the cell. The housing includes a bypass airflow conduit extending through the housing and isolated from the cell, a second conduit defined by a gap between the cell and the cell cavity, and a housing inlet in fluid communication with the bypass airflow conduit and the second conduit. An air manager is provided having an air mover configured to supply air to the inlet. A first portion of the air travels along the bypass airflow conduit to stimulate air flow within the battery compartment, and a second portion of the air travels along the second conduit to deliver oxygen to the cell.

In one preferred form, the air mover receives air from the battery compartment, and outputs the received air into the housing inlet. The first and second portions of air are exhausted from the housing and flow into the battery compartment via a housing outlet. A first portion of the exhaust air exits the battery compartment, and a second part of the exhaust air re-circulates back to the air mover. The air mover may operate at variable speeds to ensure that only the air flow necessary to operate the device flows past the cell.

In another preferred form, the housing is formed from a pair of adjacent cylindrical cell cavities having a "figure-8" cross sectional configuration, such that the bypass airflow conduit is centrally disposed between the cavities. Each cell cavity is sized to receive at least one of a AA, AAA, AAAA, C, and D sized cell.

In one form, the first portion of air and the second portion of air exit together via an outlet diffusion tube that extends between the bypass airflow conduit and the battery compartment.

In another form, the first portion of air exits the bypass airflow conduit into the battery compartment, and the second portion of air exits the second conduit into the battery cavity via an outlet diffusion tube that extends between the second conduit and the battery compartment.

In another form, an inlet diffusion tube extends between the air mover and the second conduit, such that the second portion of air travels from the air mover to the second conduit via the inlet diffusion tube.

Preferably, the air mover is disposed in a chamber that is removably connected to the housing. The air mover may be a standard fan. Alternatively, the air mover could be formed from a flexible tubing that extends between an inlet of the chamber and the housing inlet, a rotatable pump head having protrusions extending therefrom configured to compress and subsequently depress the flexible tubing, and a pump motor operable to rotate the pump head to drive air through the tubing and into the housing inlet.

In accordance with another aspect of the invention, the battery does not include the bypass airflow conduit, but rather has a housing inlet disposed in an axially upstream wall of the housing, and a housing outlet disposed in an axially downstream wall of the housing and aligned with the housing inlet. A conduit is defined by a gap between the cell and the cell cavity, and the air mover of an air manager supplies air to the housing inlet. A first portion of the air travels axially towards the housing outlet to stimulate air flow within the battery compartment, and a second portion of the air travels along the conduit to deliver oxygen to the cell.

In another aspect, methods are provided for using these batteries.

The present invention recognizes that the single function achieved by conventional air managers is inadequate to provide reliable battery operation in locations where fresh air is limited, and overcomes this deficiency by providing a dual-function air manager that 1) draws fresh air into the battery compartment, and 2) circulates a portion of the fresh air over the cell cathode to activate the battery.

The present invention further provides a air-depolarized cell cartridge that is easier and less expensive to manufacture, is self-sealing for reduced leakage, has a thin outer wall to increase power and capacity, and allows a maximum amount of air to flow therethrough and stimulate air flow in the battery compartment.

The foregoing and other aspects of the invention will appear from the following description. In the description, reference is made to the accompanying drawings which form a part hereof, and in which there is shown by way of illustration, and not limitation, a preferred embodiment of the invention. Such embodiment does not necessarily represent the full scope of the invention, however, and reference must therefore be made to the claims herein for interpreting the scope of the invention.

BRIEF DESCRIPTION OF THE DRAWINGS

Reference is hereby made to the following figures in which like reference numerals correspond to like elements throughout, and in which:

FIG. 2A is a perspective view of a battery constructed in accordance with the preferred embodiment;

FIG. 2B is another perspective view of the battery illustrated in FIG. 2A;

FIG. 2C is a top plan view of the battery illustrated in FIG. 2B showing dimensions in accordance with one embodiment of the invention;

FIG. 2D is a side view of the cell illustrated in FIG. 2C showing dimensions in accordance with one embodiment;

DETAILED DESCRIPTION OF THE PREFERRED EMBODIMENT

Figure 1:
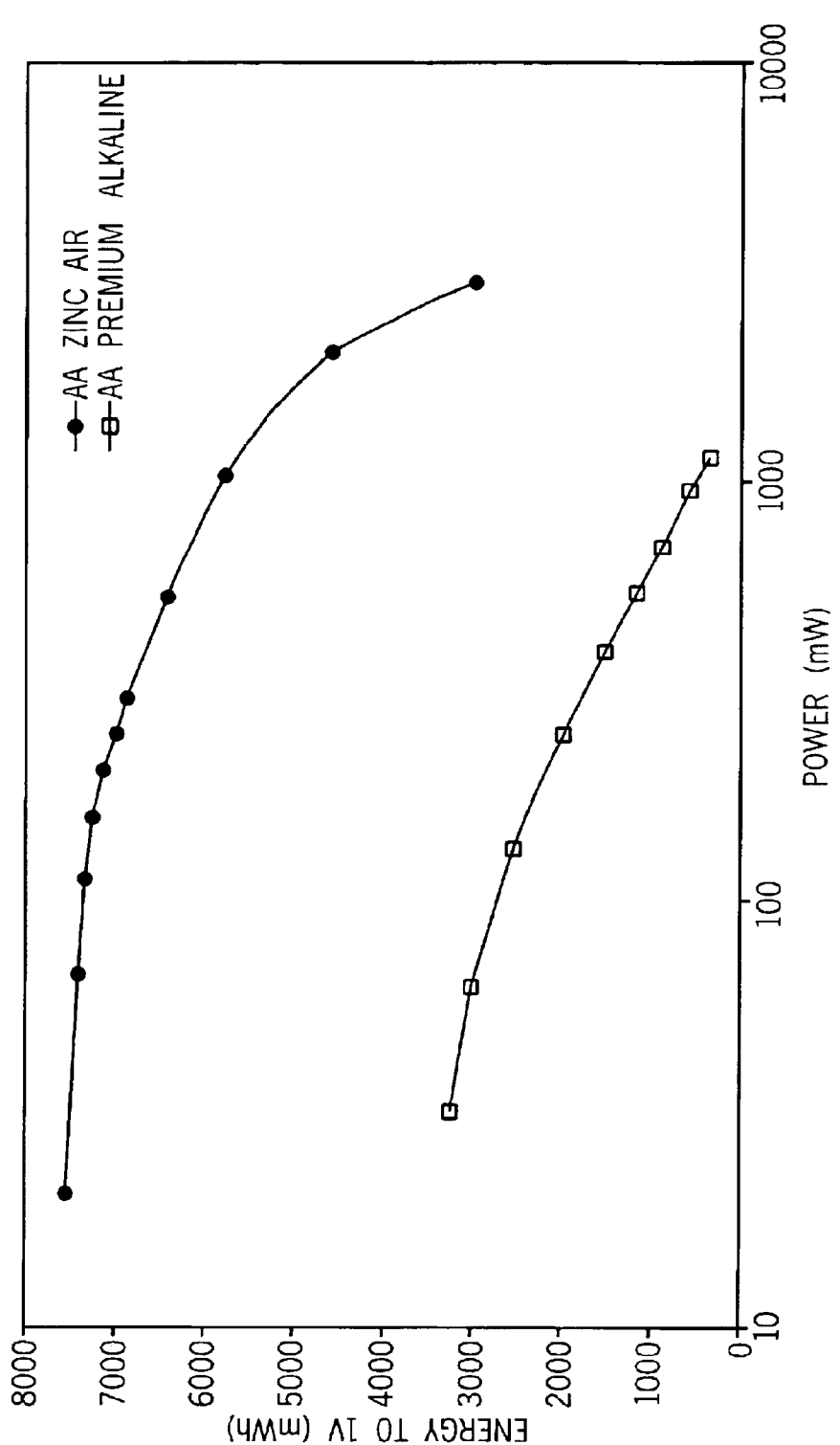
FIG. 1 depicts the energy to one volt at various power draws of zinc-air and premium alkaline AA cells.

Referring to FIGS. 2A–D, a battery cartridge 38 is sized and shaped to fit in the space otherwise occupied by alkaline cells. The dimensions illustrated in FIGS. 2B–D are in millimeters. While the cartridge 38 illustrated is sized and shaped for two AA cells, a skilled artisan will appreciate that the invention is not limited by the size or shape of the cartridge, but rather can extend to accommodate configurations of one to eight or more cells ranging in size from the smallest cylindrical round cells (AAAA) to the largest cylindrical cells (D). Cartridge 38 includes a closed base 33 and an open end 35 opposite the base into which the cells can be inserted. An air mover chamber 41 may be attached to the cartridge 38 proximal the base 33, or it could be integrally connected thereto. Cartridge 38 defines an outer housing 36 that comprises a pair of adjacent cylindrical cell compartments 67 arranged in a "figure-8" orientation. A cover 37 is hingedly attached to the cartridge at the open end 35 and has contact terminals 39 provided on its inner surface for engagement with the cells. In accordance with the preferred embodiment, the cells to be used in the cartridge are zinc-air cells, though other types of metal-air cells or other air-depolarized cells could also be used.

Figure 8:
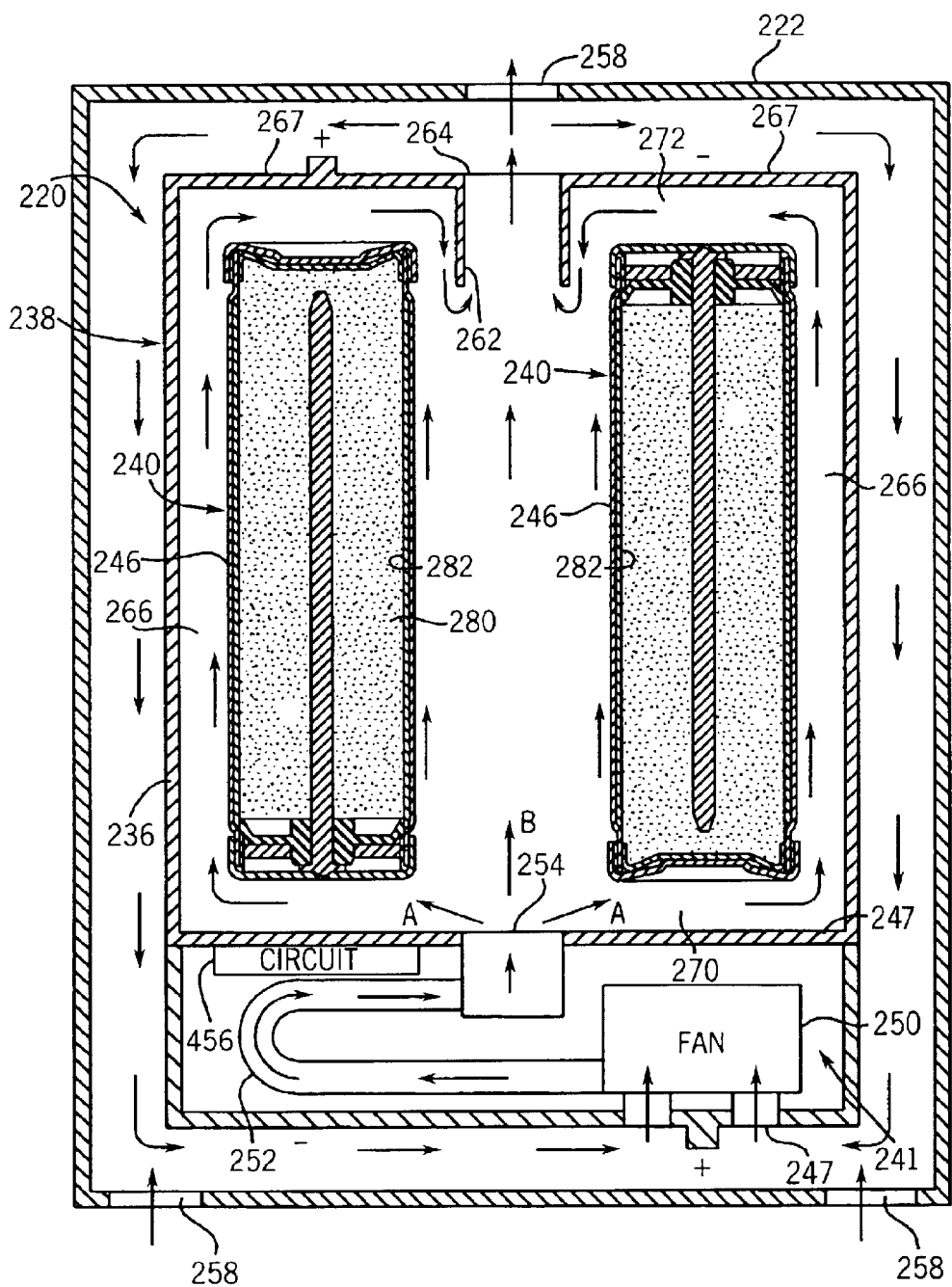
FIG. 8 is a sectional side elevation view of a battery including a metal-air cell and air manager constructed in accordance with an alternate embodiment of the invention.

The "Figure-8" cartridge 38 preferably comprises carbon steel which may be drawn into thin-walled tubes while achieving sufficient strength, such that the battery installed therein achieves superior power and cell capacity. It is further impermeable to water vapor transport and to carbon dioxide transport. The cartridge 38 may be manufactured by providing a round tube and crimping the tube longitudinally on opposite sides to form adjacent cell compartments 67. The tube is not crimped completely through its diameter, however, such that the center remains open to provide a bypass air flow tube 60 (See FIGS. 4 and 5) that allows maximum air to flow through the cartridge 38, as will be explained in more detail below. Another method of manufacture is to start with a flat metal sheet and draw it into a figure 8 shaped can with a closed bottom, as is understandable to those skilled in the art of drawn metal components. Alternatively, the cartridge 38 may be molded in plastic to provide the "Figure-8" design. A nipple 32 is formed in the cartridge to provide a positive terminal for engagement with the battery compartment of an electronic device. The result is a cartridge 38 that has a closed bottom 33, adjacent cylinders 67, and a nipple 32, and that is seamless to minimize or eliminate leakage during operation.

Cartridge 38 includes an air mover chamber 41 that is preferably disposed upstream of compartments 67 for regulating air flow through the cartridge, though it may alternatively be disposed downstream of the compartments. It should be appreciated that the terms "upstream" and "downstream" are used herein with reference to the flow of auxiliary air through the cartridge, as will be described in more detail below.

The battery cartridge 38 represents an advance over the art at least insofar as the air source is isolated from the interior of the cartridge when the air mover is not operating while being able to supply only the necessary amount of air when the air mover operating in battery compartments having low porosity with respect to the ambient environment, thereby extending the life and potential of the zinc-air cells.

The housing 36 and air mover chamber 41 may either be integrally connected, or be attached by any suitable mechanical fastening technique. For example, the air mover chamber 41 could be snap-fit onto a ball extending from the battery housing. A gasket may be provided at the interface between the chamber 41 and housing 36 to prevent air leakage during operation in this embodiment. Otherwise, chamber 41 could be formed integrally with the battery housing 36 during manufacturing.

Figure 3:
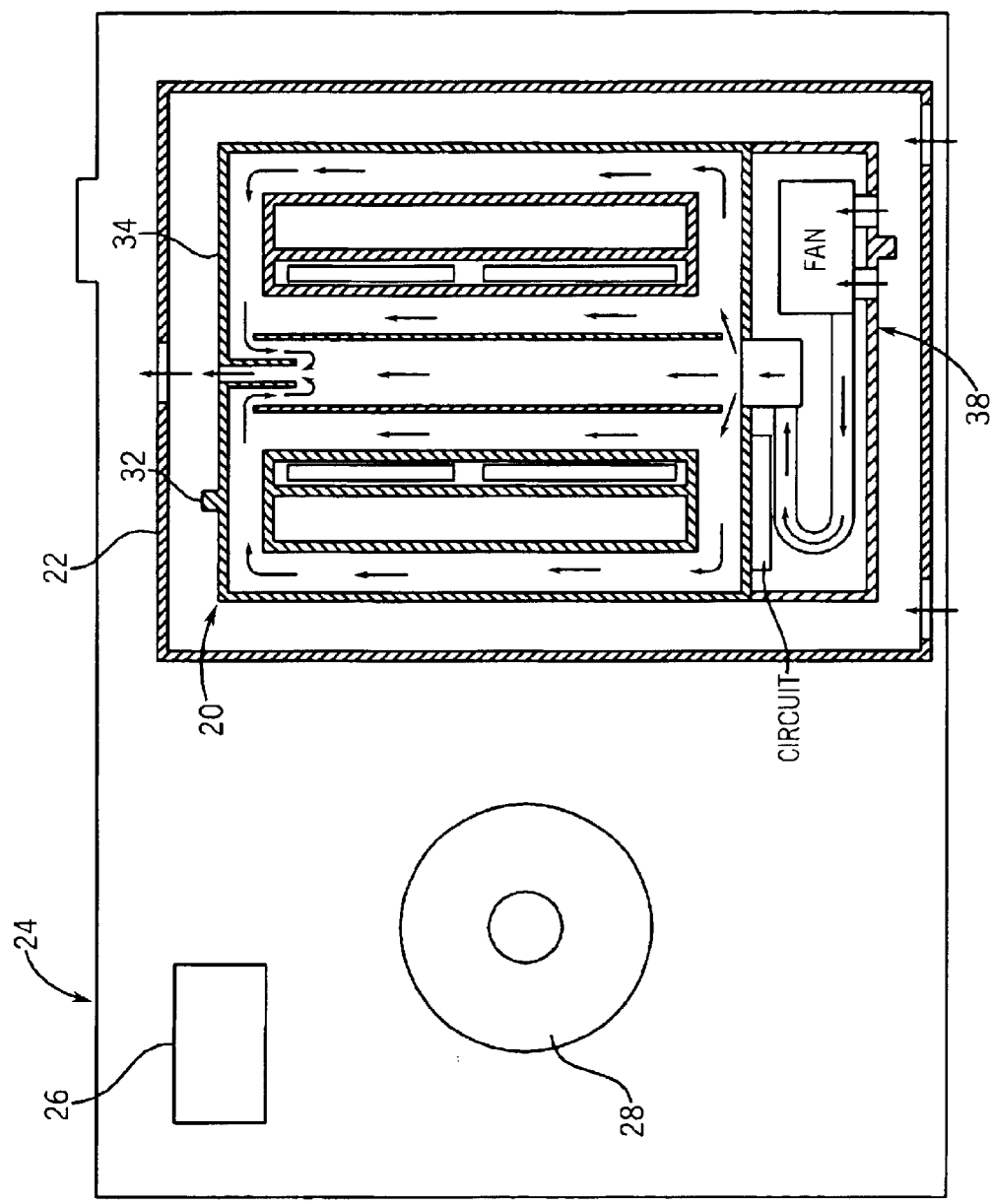
FIG. 3 is a schematic representation of a battery including a metal-air cell and air manager constructed in accordance with an alternate embodiment installed in an electronic device.

Referring also to FIG. 3, the cartridge 38 (including chamber 41) is installed within a battery compartment 22 of a conventional electrical device, such as a digital camera 24. While the battery 20 could be installed into any suitable electronic device, the digital camera 24 is illustrated as such devices are notorious for being associated with short battery lives. For instance, when installed in a camera, the battery compartment 22, when closed, is incapable, in the absence of an operating air moving device, of admitting sufficient air to support 0.02–0.045 (and excess thereof) watts per square centimeter of air electrode area from a metal-air battery. As will be described in more detail below, a battery having an air-depolarized power source constructed in accordance with the present invention is capable of directing air to the air electrode and to draw into the battery compartment, when closed, sufficient air to support output from the power source of at least 0.045 watts per square centimeter of air electrode area.

The battery 20 having at least one air-depolarized cell may thus be disposed in a battery compartment of an electrical device to supply power to the device. Advantageously, the battery 20 has an air mover assembly that is capable of stimulating airflow inside the battery compartment such that the battery can operate at rates of current greater than that which would be sustainable from air circulation within an air-depolarized cell installed in the battery compartment where no air mover assembly is present. This is particularly useful when the battery compartment has only limited access to air from the ambient environment.

As will become understood by a skilled artisan, the benefits of maximizing the life of a metal-air battery within a battery compartment of a digital camera or other comparable device with limited access to ambient air are achieved. Advantageously, cartridge 38 may accommodate cells of any suitable size needed to provide the voltage required by the camera 24. The cartridge has a positive terminal 32 and a negative terminal 34 for standard installation within a conventional battery compartment 22 that is configured to accept standard alkaline cells.

The conventional digital camera 24 includes a light source 26 for taking suitable photographs during periods of low ambient light, and a shutter assembly 28 that opens momentarily to retain the image being photographed. Digital cameras further include erasable memories (not shown) that record the photographed images that may be subsequently downloaded to a more permanent storage device, such as a personal computer. Digital cameras thus draw varying amounts of power during operation, and may demand as much as one Amp or more from the cells during operation. Digital cameras, along with many electronic devices, are not air tight, however the leakage of fresh ambient air into the battery cavity is insufficient so as to render impractical the installation of batteries employing a conventional air manager. Battery cartridge 38, on the contrary, is able to augment the low porosity of the battery compartment 22 with respect to the ambient environment by using the bypassed air from the air mover to stimulate air flow into the battery compartment without depleting the cells, thus rendering camera 24 suitable for longer use as will become apparent from the description below.

Figure 4:
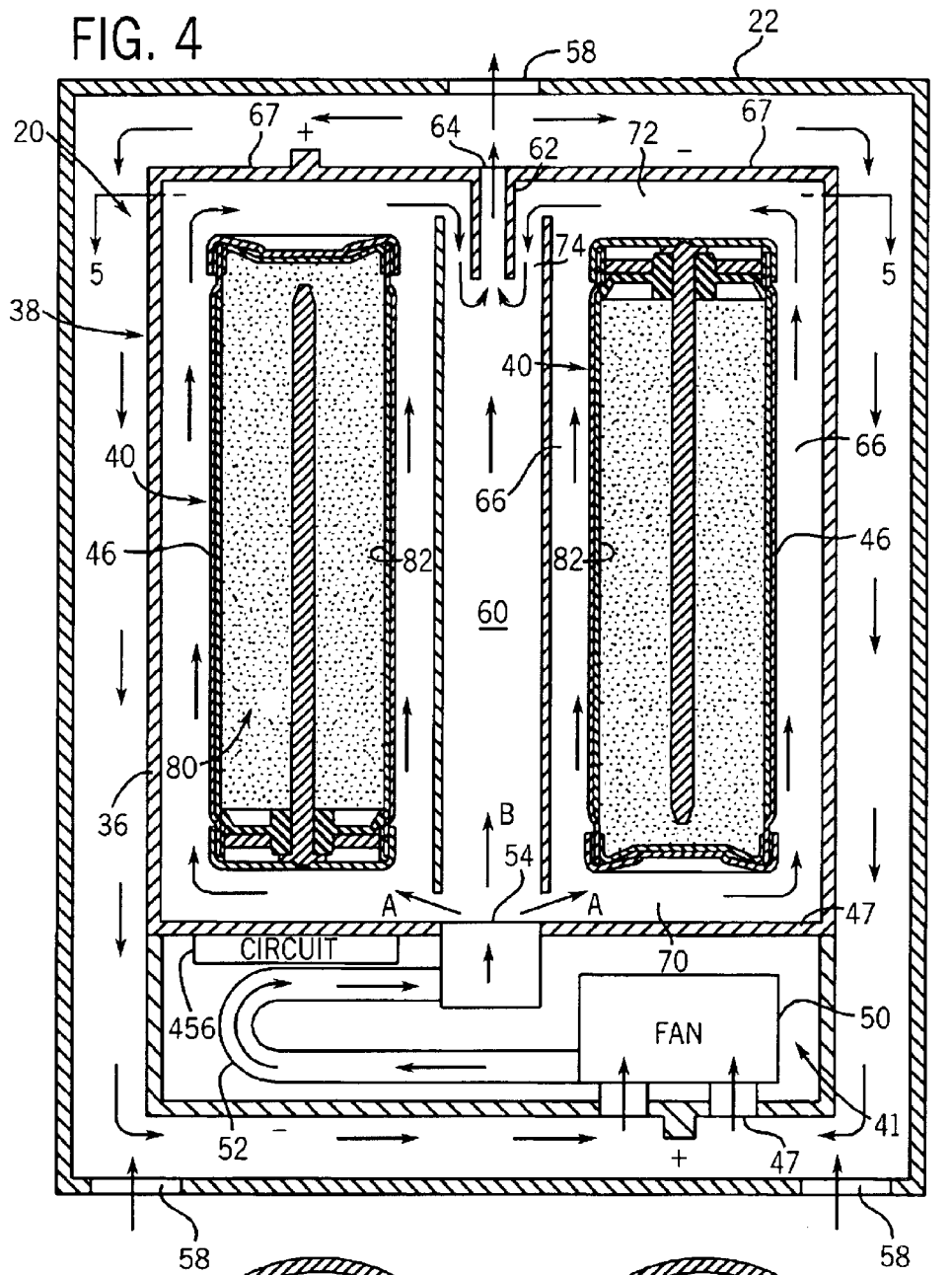
FIG. 4 is a sectional side elevation view of the battery illustrated in FIG. 3.
Figure 5:
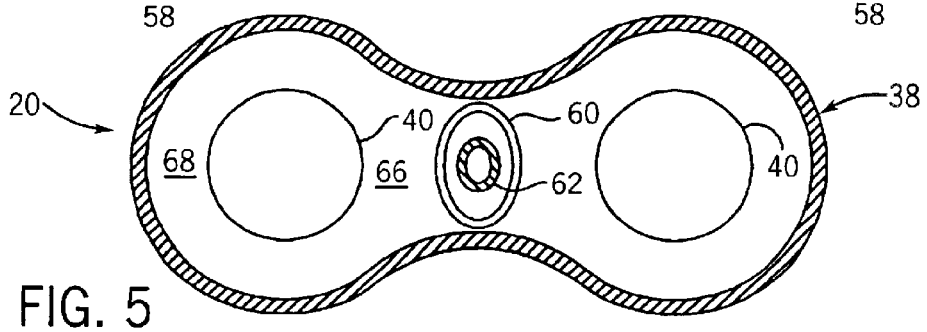
FIG. 5 is a sectional end elevation view of the battery illustrated in FIG. 4 taken along A—A.

Referring now to FIGS. 4 and 5, the internal components of cartridge 38 are illustrated. As described above, housing 36 includes a pair of cell compartments 67 in a "figure-8" configuration and air mover chamber 41 that are separated by a divider plate 47 extending laterally across the cartridge. A pair of metal-air cells 40 that produce a current at a pre-determined voltage when exposed to a flow of oxygen is disposed in the each compartment 67, respectively. An annular conduit, or plenum, 66 is defined by the gap that is disposed between the outer wall of cell cathode 46 and the inner surface of the battery housing 36. Cells are held in place within housing 36 via a spring or any alternative suitable mechanical fastener, as appreciated by a skilled artisan.

Those skilled in the art will also appreciate that many different catalyst systems are available for air cathodes, and that the advantages of the present invention with regard to controlling water vapor transfer to and from the cell are applicable to any air cathode chemistry. An example of an air cathode suitable for use with the present invention is described in U.S. Pat. Nos. 4,354,958; 4,518,705; 4,615,954; 4,927,514; and 4,444,852, each of which is hereby incorporated by reference as if set forth in its entirety herein.

Figure 10:
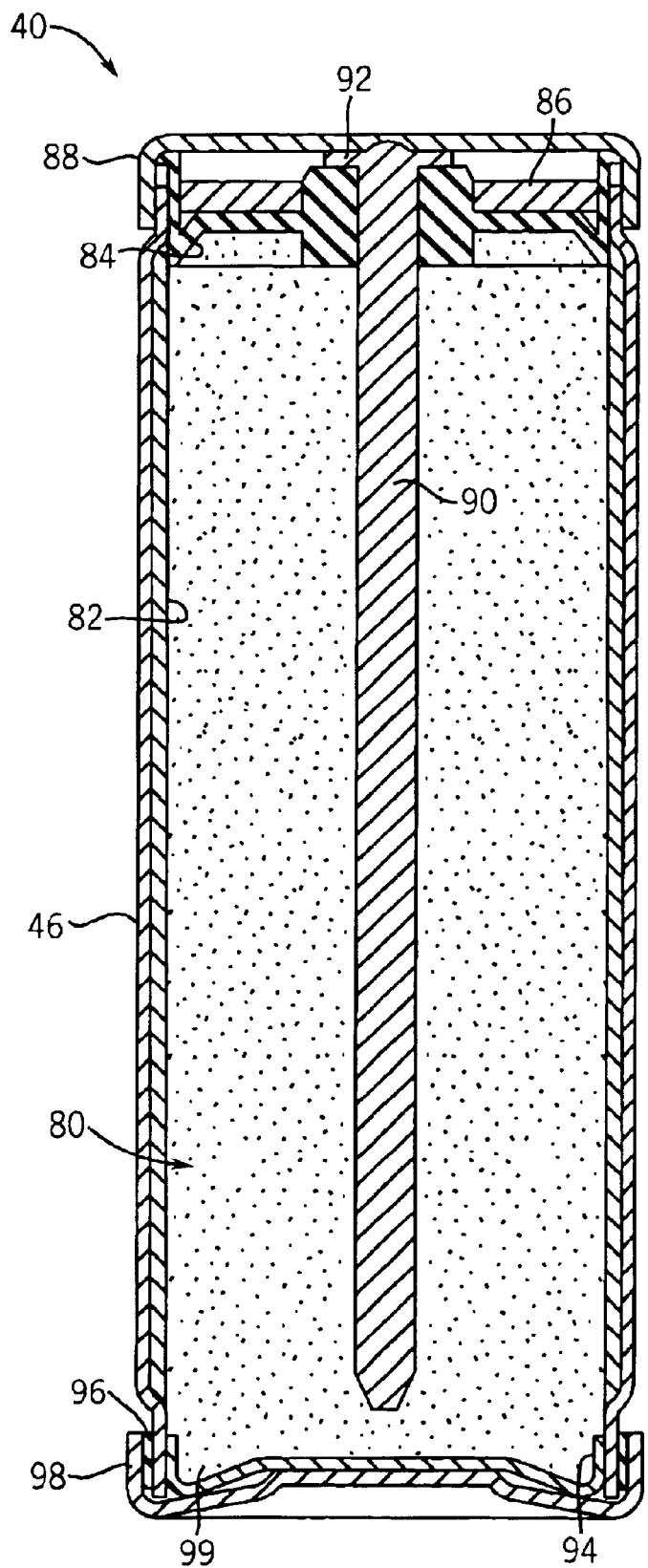
FIG. 10 is a sectional side elevation view of a battery cell constructed in accordance with the preferred embodiment

Referring also to FIG. 10, each metal-air cell 40 further includes an anode/electrolyte chamber which contains an anode and an electrolyte 80 which may comprise, for example, a 38% solution of potassium hydroxide. The anode may typically consist of a zinc paste and may be positioned in the manner described in U.S. Pat. No. 4,957,826, which is hereby incorporated by reference as if set forth in its entirety herein.

Each cell 40 includes cathode rings 46 that are separated from the anode/electrolyte mixture 80 via any suitable separator 82 that allows electrolyte to transfer between the anode and cathode while electrically isolating the anode and cathode from one another. The negative end of cell 40 includes a gasket 84 that spans between the nail 90 and an upper cup member 88 that is crimped to seal the cell 40. The nail 90 includes an upper flange 92 extending radially outwardly between the gasket and upper cup to retain the nail in its proper position and orientation. An annular washer 86 occupies the space between the radially inner and outer portions of gasket 84, and ensures that a tight seal exists between the gasket 84 and nail 90, and further between gasket 84 and cathode 46. This compact design permits a greater volume of active material to occupy the cell compared to conventional metal-air cells.

The positive end of the cell 40 includes an inner cup member 94 that provides a seal with respect to the inner surface of cathode 46. A gasket 96 is disposed on the outer surface of the cathode 46, and is sandwiched between the cathode and an outer cup member 98, which provides a seal for the end cap. The combination of upper and lower cup members 94 and 98, respectively, define an annular cup-shaped void 99 circumscribing the outer periphery of the end cap. Void 99, which is filled with the mixture 80, also permits a greater volume of active material to occupy the cell, thereby adding to the life of the battery.

Figure 6:
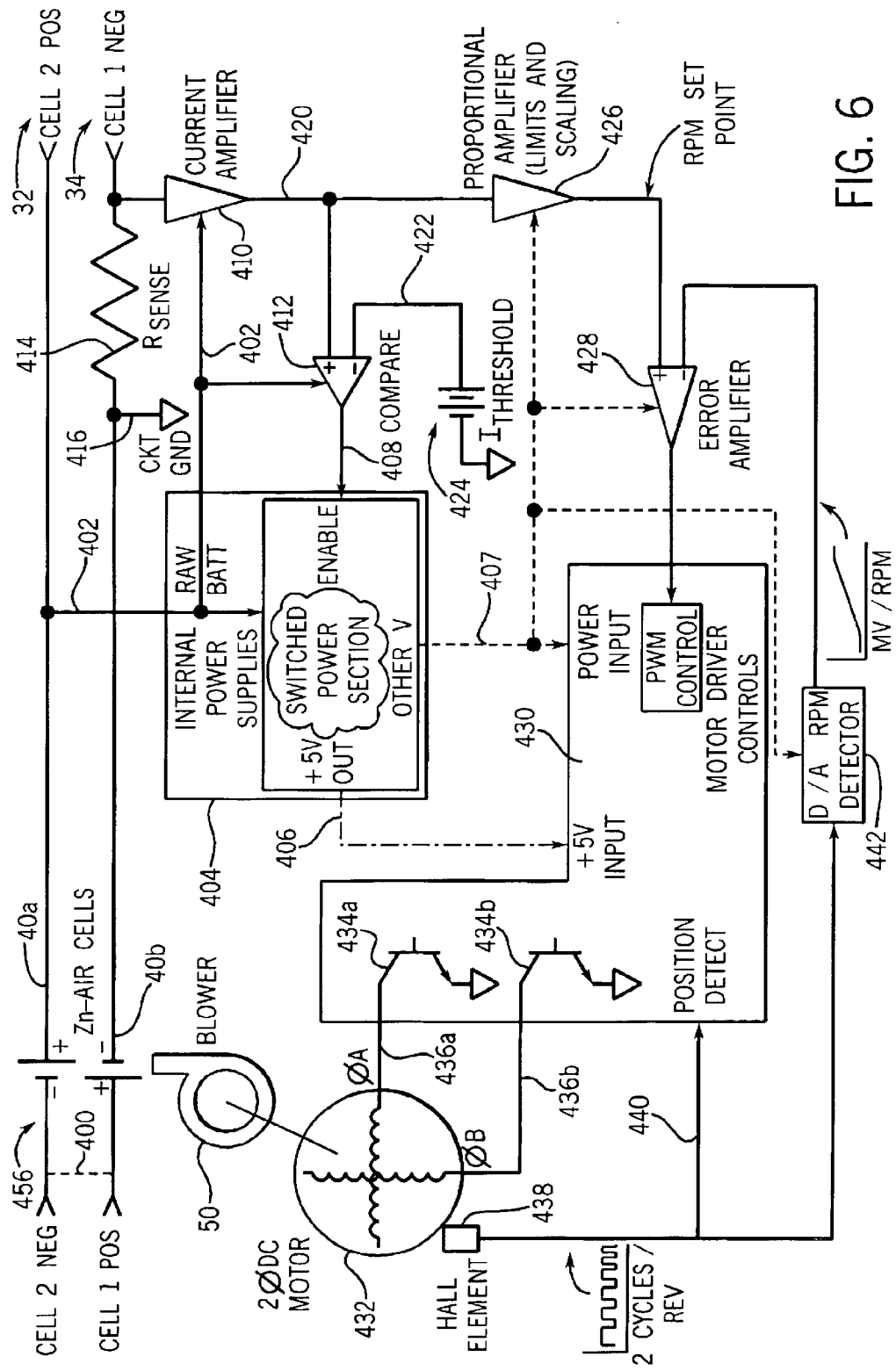
FIG. 6 is a block diagram of the circuitry illustrated in FIG. 4.

Referring once again to FIG. 4, the air mover chamber 41 contains an air mover assembly having an air mover, such as a variable-speed fan 50 that, during operation, draws air from the battery compartment 22 via inlet 43, and expels the air into the active section of the battery via an inlet diffusion tube 52 that interfaces with an opening 54 extending through plate 47. Opening 54 is axially aligned with bypass air flow tube. 60 to enable fluid communication between the air mover chamber 41 and cartridge 38. The operation of fan 50 is controlled by electronic circuitry 456 that controls the speed of fan 50 depending upon the quantity of oxygen needed across the cells 40 to provide only the necessary power to operate the electronic device and also the fan, as is illustrated in FIG. 6, which is described in more detail below. Because many electrical devices of this type are not completely air tight, the suction created at the inlet of the fan 50 is sufficient to draw fresh air from the ambient environment, into the camera 24, and ultimately into the battery compartment 22 to be received by the fan 50. The air is illustrated as entering the battery compartment 22 at several locations, which are symbolically identified as openings 58. Accordingly, the air circulated throughout the cartridge 38 is maintained at a sufficiently high oxygen concentration so as to support the discharge of the metal-air cells 40. It should be appreciated that openings 58 are typically small so as to render conventional air managers inoperable, as described above.

As will now be described, the air exhausted by fan 50 (intake air) is split into two streams, an active stream and an auxiliary stream. The first stream (active stream) is the air flow used for the operation of the cells 40, and the second stream (the auxiliary stream) is an additional air flow that induces a suction at openings 43 and 58 to draw a sufficient amount of air and oxygen from the ambient environment.

In particular, the air exiting diffusion tube 52 at opening 54 flows in one of three directions. The majority of the air is the auxiliary stream, and flows in the direction of Arrow B axially downstream through a centrally disposed bypass air flow tube 60. A smaller amount of air, the active stream, flows in the direction of Arrow A radially outwardly from opening 54 in either direction to provide a fresh supply of oxygen to the cells 40 as will be described in more detail below. The diameters and lengths of the various conduits supporting air flow within the cartridge 38 are constructed in accordance with the preferred embodiment such that approximately 70% of the air flow from the fan enters the bypass air flow tube 60, while approximately 30% is directed to the cell or cells 40. Of course, it should be easily appreciated that these percentages may vary. A range between 50–90% of the air flow entering tube 60, with 10–50% entering the cell(s) is preferred. However, a skilled artisan will appreciate that anywhere from 10–90% of the air flow may enter tube 60, with the remaining 10–90% could enter the cell(s). It has been found that the auxiliary air flow is sufficiently strong to draw a suitable amount of air into battery compartment 22, thereby maintaining an adequate supply of fresh air (and oxygen) to the cells 40 via the active stream.

In particular, when one Amp of current is demanded by the electronic device, each cell 40 demands an air flow of between 50 and 100 cubic centimeters per second across the cell, it being appreciated that this flow rate will vary as varying current demands placed on the cells during operation of device 24. The auxiliary air flowing through the bypass air flow tube 60 flows into an outlet diffusion tube 62, which is preferably potted into the end of the cartridge 38. Tube 62 extends axially upstream from the downstream end of housing 36, a portion of which is centrally disposed within tube 60. Air flowing into the outlet tube 62 flows through an opening 64 disposed in the outer housing 36, and into the battery compartment 22, where a portion is directed back into the camera and ambient environment through symbolic opening 58. Still other air from the exiting air flow is directed around the cartridge 38 in either direction to once again be circulated by the fan 50. The returned air is mixed with fresh air from the ambient environment in the battery cavity 22 proximal inlets 43 to maintain a sufficient supply of oxygen to the cells 40.

The air that flows from diffusion tube 52 into the cell cartridge 38 (the active stream) will now be described with reference to only one of the cells, it being appreciated that the air flow is substantially similar through the other cell. In particular, the spaces between the outer surfaces of conduit 60 and cell 40 and the inner surface of housing 36 define an annular plenum 66. The axially extending conduits are connected at their opposite outer ends to an upstream laterally extending conduit 70, and a downstream laterally extending conduit 72. The air traveling along Arrow A is either directed axially downstream along plenum 66, or laterally outwardly through conduit 70 and subsequently axially downstream through the plenum such that the cell 40 is surrounded on all sides by fresh air, defined as having a high enough oxygen concentration as to support the cell discharge. As the active stream passes through plenum 66, the oxygen in the air reacts with cathode 46 to activate the battery cells. The active stream is subsequently directed into a neck 74 that is formed between the inner surface of tube 60 and the outer surface of outlet diffusion tube 62. The air then travels into tube 62, where it mixes with the auxiliary flow and is re-circulated as described above. Because the active flow combines with the auxiliary flow in tube 62, and subsequently combines with fresh ambient air in cavity 22, the active flow always has a sufficient concentration of oxygen to activate the cells 40.

It has been found that certain dimensions for the various flow tubes achieve preferred flow rates for the active and auxiliary air flow. In particular, bypass tube 60 preferably has a rectangular cross section, and is 5 mm×2 mm wide, and 30 mm long. Outlet diffusion tube 62 is substantially cylindrical, has a 2 mm diameter, and is 6 mm long. Inlet diffusion tube 52 is rectangular, and is 1.88 mm by 1.32 mm wide, and is 11.4 mm long, while plenum 66 is ½ mm thick. It should be easily appreciated by one having ordinary skill in the art that these dimensions are only one of many that render the present invention operable, and the invention is not to be construed as limited to these preferred dimensions.

The combination of the fan and conduits within the cartridge 38 thus provides an air manager having a dual-function operation. In particular, active air is moved over the cells 40, and auxiliary air is also moved through the cartridge 38 to ensure a sufficient oxygen supply to the cells 40. Otherwise stated, one function is the moving of air over the cells 40, while the other function stimulates flow in the cartridge 38. Because the movement of air induced within the cartridge 38 is sufficient to transfer enough oxygen into the conduit 52 from the open air surrounding the device 24, the cells are permitted to operate at their desired rate. Because the air flowing through tube 60 has a shorter, less constricted path compared to conventional air managers, the losses due to pumping are reduced, and the fan size is kept reasonable even though a greater quantity of air is circulated than required in a conventional air manager without the dual function.

The auxiliary flow of the present invention allows air to be input into the battery at a significantly higher rate than that needed by the cell for operation. This is achieved without overexposing the cathode to air, which would cause the premature degradation of the cell as described above. In particular, the fan takes in air from the battery compartment 22 at a flow rate of, for example, between 10 and 25 times or more of that needed by the cathode. For example, if the stoichiometric air requirement for a zinc air cell is 18.1 cc of air per minute to provide one Amp, the present air manager is capable of providing between 362 and 905 cc/min for a two cell pack. The high air flow rate creates a significant pressure gradient between the battery compartment 22 and ambient environment so as to draw air from the ambient environment even where the battery compartment 22 is constructed to have low porosity with respect to the ambient environment. The auxiliary air flow prevents the high flow rate from overexposing the cell to the environment, thus decreasing the cell performance. Conventional air managers are designed to flow between 4 and 6 times this required air flow during operation, for example 145–217 cc/min for a two cell pack operating at one Amp. If conventional air managers circulated air at the flow rate achievable in accordance with the present invention, the cathode would become over-exposed, thereby significantly reducing the life of the battery.

As described above, conventional metal-air cells are subject to drying out, flooding, or premature carbonation when air travels across the cells either 1) at a greater rate than that demanded by the device, or 2) when the device is not in use. In order to prevent premature dry-out and/or carbonation, it is necessary to limit the flow of air to the cells 40. This is achieved by implementing a variable speed fan in combination with the circuitry 456 illustrated in FIG. 6, as will now be described.

In particular, the electronic circuitry 456 for controlling the variable speed fan 50 draws its power from the two metal air cells 40a and 40b as may be connected in series through connection 400 so that the negative terminal of metal air cell 40a connects to the positive terminal 32 of metal air cell 40b. Positive terminal 32 with metal air cell 40a provides power through lead 402 to a switching power supply 404 of a type well known in the art to produce regulated power for lead 406 and other necessary voltages 407 when enabled at an enable input 408. Such power supplies are well known in the art and provide extremely efficient power regulation when operating and may be switched off through the enable input 408. The power lead 402 is also provided to current amplifier 410 and comparator 412 which must remain active at all times as will be understood.

The regulated voltages from the switch power supply 404 of 406 and 407 which may be switched off by the enable input 408 are indicated by dotted lines whereas the raw battery power prior to receipt by the switching power supply 404 that remains on at all times is indicated by solid lines 402.

As mentioned above, the operation of the circuitry 456 is to provide operation of the air mover 50 according to the demands placed on the cells 40a and 40b (electrical demand) by electrical device 24. This demand is sensed by a sensing resistor 414 placed in series with the negative terminal of cell 40b and the negative terminal 34 exposed by the cartridge 38. Thus any current flowing through the series of connected cells 40a and 40b passes through the sense resistor 414 to provide a voltage drop across the sense resistor 414 that may be detected through a circuit ground 416 being the side of the sense resistor 414 closest to the negative terminal of metal air cell 40b and an input to a current amplifier 410 being on the side of the sense resistor 414 closest to the exposed negative terminal 34 of the cartridge 38. The current amplifier produces a current drain signal 420 that is received by the positive input of the comparator 412. The negative input of the comparator receives a current threshold signal 422 provided by internal voltage reference source 424 to produce a threshold current signal that drives the enable input of the switch power supply.

It will be understood to those of ordinary skill in the art from this description that the operation of the current amplifier 420 and comparator 412 together with the voltage source 424 is to disable the internal power supply 404 at times when current drain from the cells 40a and 40b is below a predetermined threshold and to enable the power supply only if current drain exceeds this amount. The threshold could be set, for example, to an amount slightly greater than the minimal amount of current necessary to support operation of camera 24 in "standby" mode, such that the fan would operate only when extra current was needed. Because the fan is connected to the cells at a location upstream of resistor 414, the current that is sensed is only that current necessary to operate the camera 24. The current demand signal 420 is also received by a proportional amplifier 426 that may scale the signal appropriately and limit the signal below a predetermined maximum demand signal according to techniques well known in the art. The proportional amplifier 426 determines a necessary fan speed corresponding to the electrical demand.

The output of the proportional amplifier 426 provides a desired RPM set point received by one input of air amplifier 428 which acts as a differential amplifier with the signal of the RPM set point received by its positive input. The output of the amplifier 424 is received by the input of a pulse width control motor circuit 430 which receives an RPM signal and uses it to control power to a motor 432 in proportion to the signal from the air amplifier 428. The motor controller 430 includes commutating circuitry of a type well known in the art providing switched power signals through switching transistors 434a and 434b to quadrature armature windings 436a and 436b, respectively, of the motor 432 whose amplitude is proportional to the voltage provided by the pulse width modulated control. The control of the transistors 434a and 434b is synchronized to the roter of the motor 432 (not shown by a hall effect sensor 438) received at a position detecting input 440 of the motor controller 430. Generally, therefore, the higher the voltage to the input pulse width modulated control of the motor control 430, the faster the rotation of the motor 432 and hence, the connected variable speed fan 50. The signal from the hall effect transducer 438 is also provided to a digital to analog converter 442 which converts it to an analog signal to be received by the inverting input of error amplifier 428 to complete a feedback loop that serves to regulate the speed of the motor 432 to match the RPM set point provided by proportional amplifier 426.

The net effect is that the speed of the motor is made functionally dependent on the amount of current drain from the cells 40a and 40b and thus the amount of air circulation is made dependent on the power being drawn from the battery. Power inputs to the motor controller 430, the amplifier 428 and the proportional amplifier 426 are switched off when the demand current being drawn from the batteries 40a and 40b, as sensed by resistor 414 is below a certain threshold thus conserving power for low power drains and prolonging the activated shelf life of the batteries. During the time when current drain from the cells 40a and 40b is below the threshold established by the current amplifier 410 and the sensing resistor 414, the air mover 50 is deactivated.

The hall effect transducer 438 provides its position signal by measurement of the magnetic field associated with the permanent magnet rotor of the motor 432. Comparator 412 and error amplifier 428 may be differential input operational amplifiers of the type well known in the art. The D to A converter 442 is also deactivated when the switch power supply 404 is disabled. The motor controller 430 receives the regulated power from the switching power source 404 over line 405 for its logic circuitry and a higher voltage over line 407 for providing directly to the motor 432.

In particular, the circuitry 456 senses the amount of current necessary for operation of the device 24, and determines the fan speed necessary to circulate the necessary oxygen. The circuitry 456 also determines the amount of power necessary to operate the fan 50, and adds that to the power requirements of the device 24 to determine the fan speed needed to operate the device 24 as well as the air manager. Accordingly, only the necessary amount of oxygen is supplied to the cells 40, thereby maximizing the life of the cells.

Figure 7:
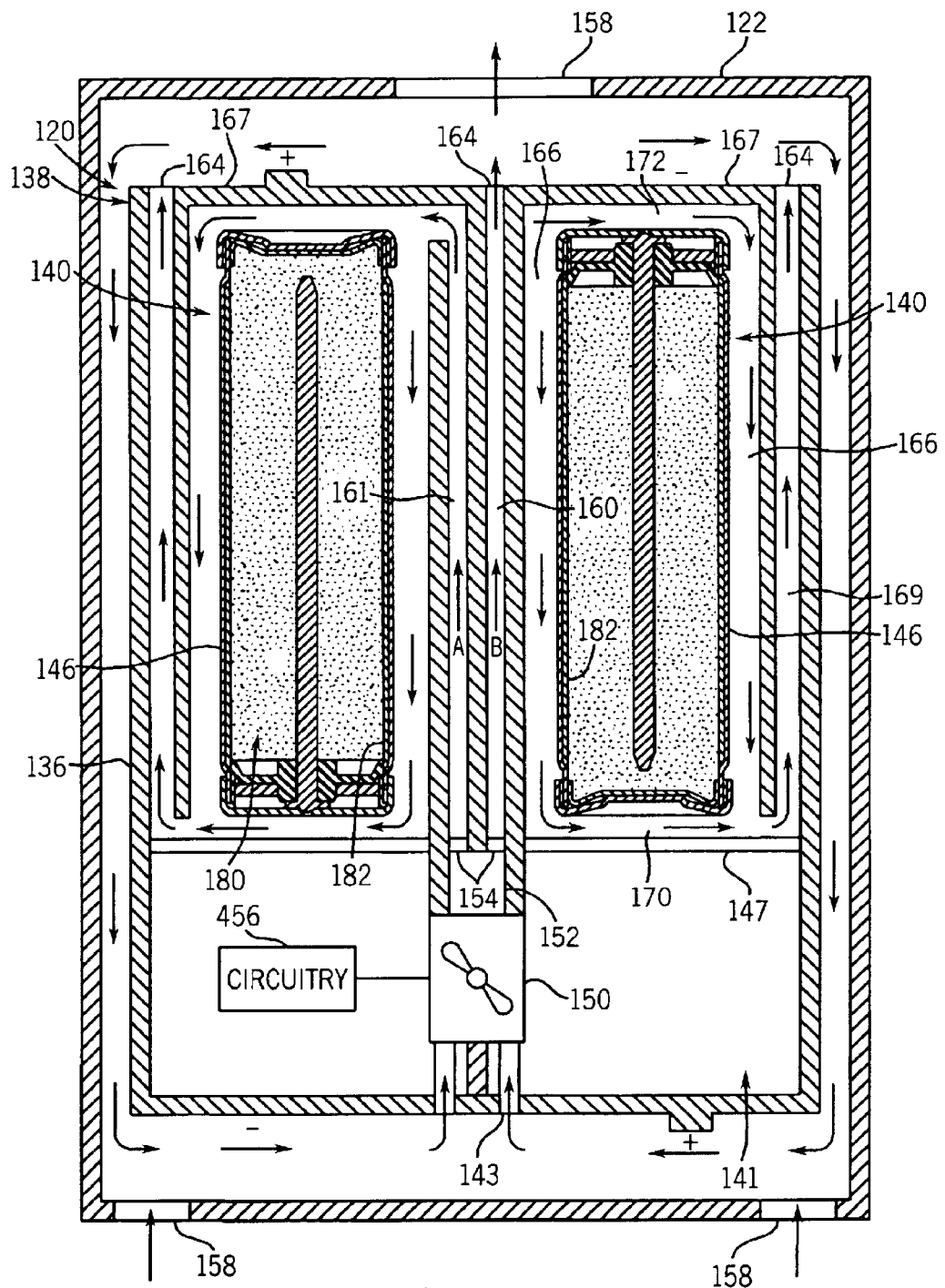
FIG. 7 is a sectional side elevation view of a battery including a metal-air cell and air manager constructed in accordance with an alternate embodiment of the invention.

Referring now to FIG. 7, a cartridge 138 is illustrated in accordance with an alternate embodiment, wherein like elements corresponding to the embodiment illustrated in FIG. 4 have been incremented by 100 for the purposes of clarity and convenience. This alternate embodiment is illustrated to demonstrate that various flow path arrangements are possible that achieve the advantages associated with the dual function, split air flow of present invention. It should be appreciated that all such variations that achieve an air manager having the above-described dual function, or a split air flow, are within the scope of the present invention, as defined below by the appended claims.

In accordance with this embodiment, the intake air is split into an active stream (travelling along Arrow A) and an auxiliary stream (travelling along Arrow B) to provide the dual functions described above. The auxiliary stream flows axially downstream via bypass airflow tube 160, which is formed as part of battery cartridge 138, and out cartridge via opening 164, and into the battery compartment 122. Some of the auxiliary air then flows out symbolic openings 158 in the battery compartment 122, while other of the auxiliary air flows back around the cartridge 138 within battery compartment 122, where it mixes with ambient air entering through symbolic openings 158, and returns to fan 150 via inlet 143.

The active air flows axially downstream within active inlet diffusion tube 161, which is positioned adjacent and parallel with bypass airflow tube 160. The active air is then divided and flows to axially downstream lateral conduits 172 of both cells 140, it being appreciated that active air travels through an aperture (not shown) and into the adjacent cell. The air then flows axially upstream through plenum 166, surrounding the cells 140. The air disposed in the radially inward portion of plenum 166 flows axially upstream and subsequently radially outwardly via conduit 170. The active air then merges at the interface between radially outer portion of plenum 166 and conduit 170, and flows axially downstream via outlet diffusion tubes 169. The active air then flows from tubes 169 out of the cartridge 138 via opening 164 and into the battery compartment 122, where it becomes mixed with the auxiliary flow and is subsequently directed around the cartridge and once again into the fan inlet 143. As noted above, a portion of the active air escapes through air leaks in the battery compartment 122 and device 124.

Referring now to FIG. 8, a cartridge 238 is illustrated in accordance with an alternate embodiment, wherein like elements corresponding to those of the previous embodiment have been incremented by 100 for the purposes of clarity and convenience. In particular, this battery achieves a split, dual function, air flow without using a bypass airflow tube. Instead, air flow exiting conduit 252 via aperture 254 may travel axially downstream in the direction of Arrow B, or radially outwardly in the direction of Arrow A. Some of the air flowing in the direction of Arrow B flows through cartridge 238 without contacting the cathode 246 and exits view outlet diffusion tube 262, thereby providing an auxiliary supply for drawing fresh air into the battery compartment 222. Other of the air also exits conduit 252 and travels along the direction of Arrow B, making contact with the cathode, thereby providing an active flow for the cells 240. A second portion of active air flow travels along of Arrow A and into plenum 266, where it also contacts the cathode to energize the cells.

Because the air flow within cartridge 238 is less restricted by the absence of the air flow tube, the fan is able to operate more efficiently. As a result, energy is conserved during operation, and a smaller fan may be installed to achieve a given flow rate, it being appreciated that the available space for the fan in the battery is limited to maximize the amount of active ingredient in the cells. It should further be appreciated that an optional deflector plate (not shown) may be disposed in the cell proximal opening 254 and positioned so as to direct a portion of the air exiting conduit 252 radially outwardly in the direction of Arrow A to stimulate air flow through the plenum 266.

Figure 9:
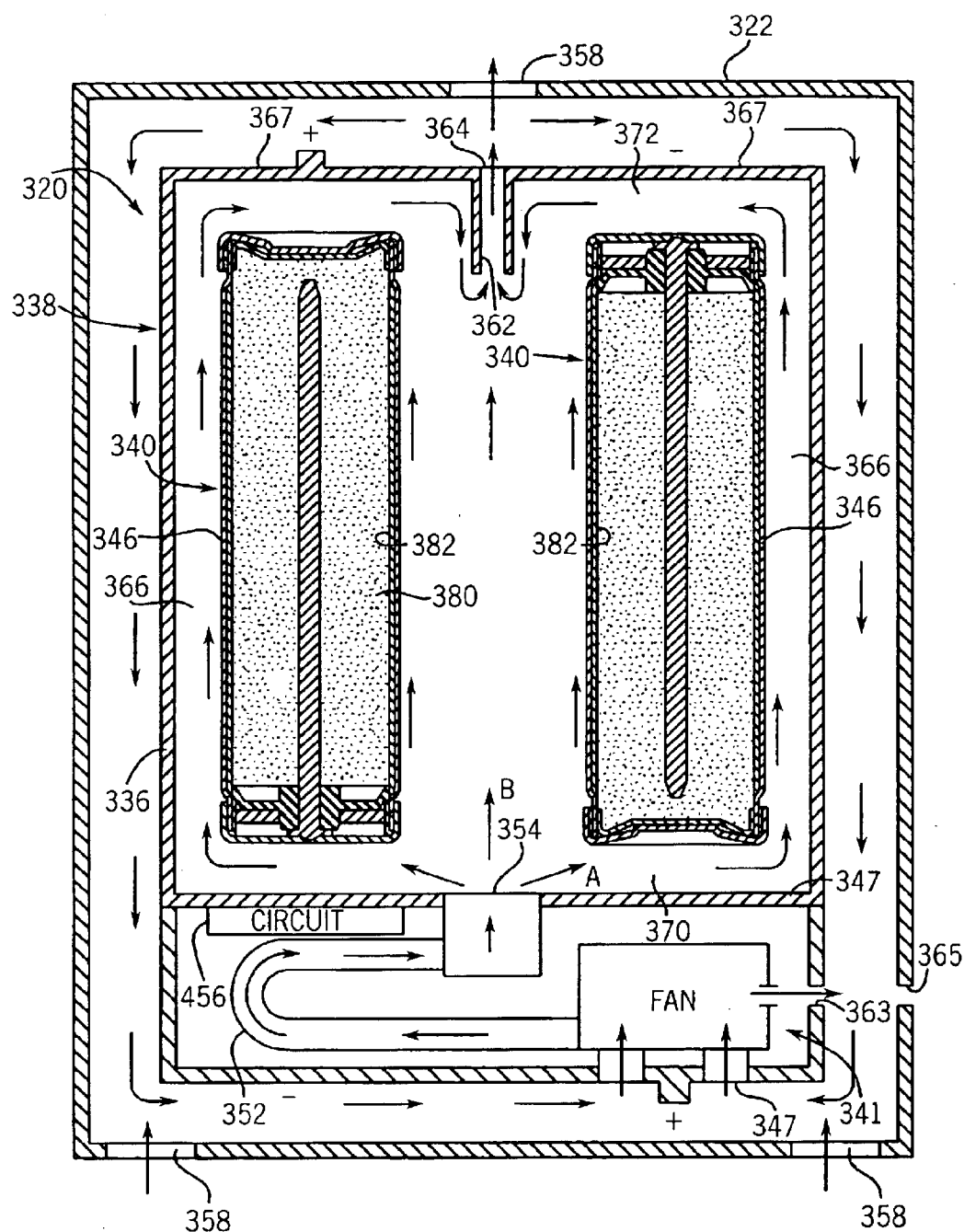
FIG. 9 is a sectional side elevation view of a battery including a metal-air cell and air manager constructed in accordance with an alternate embodiment of the invention.

Referring now to FIG. 9, a cartridge 338 is illustrated in accordance with an alternate embodiment, wherein like elements corresponding to those of the previous embodiment have been incremented by 100 for the purposes of clarity and convenience. Cartridge 338 also achieves the dual function, split air flow as described above. In particular, the fan intakes air from compartment 322 at a high flow rate, and exhausts the majority of this flow as auxiliary air flow through aperture 363 in the outer housing of the air mover chamber. Some of the air is re-circulated in the battery compartment to be re-circulated by the fan, while other of the flows from the battery compartment and into the ambient environment via opening 365. The remaining portion of auxiliary air flow enters battery cartridge 338 via conduit 352, and travels primarily axially downstream in the direction of Arrow B, and exits via outlet diffusion tube 362. A portion of active air flow also travels along the direction of Arrow B, while the other portion of active air flow travels radially outwardly into plenum 366 before traveling downstream and back into tube 362. As stated above, a deflector could be installed that increases the flow in the radial direction. As the active air travels downstream, it contacts the cathode 346, thus activating the cells.

Figure 11:
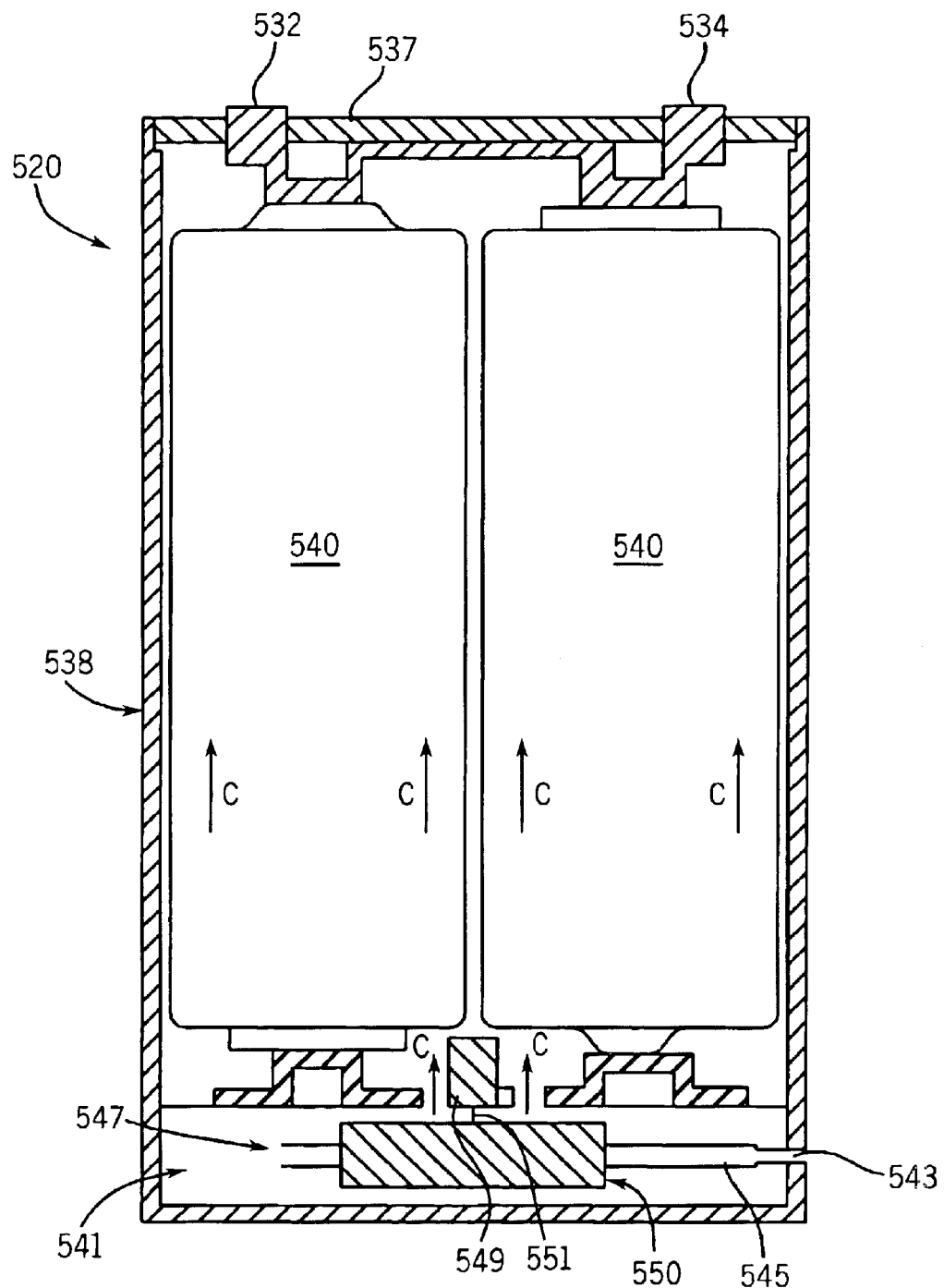
FIG. 11 is a sectional side elevation view of a battery cartridge constructed in accordance with the present invention.
Figure 12:
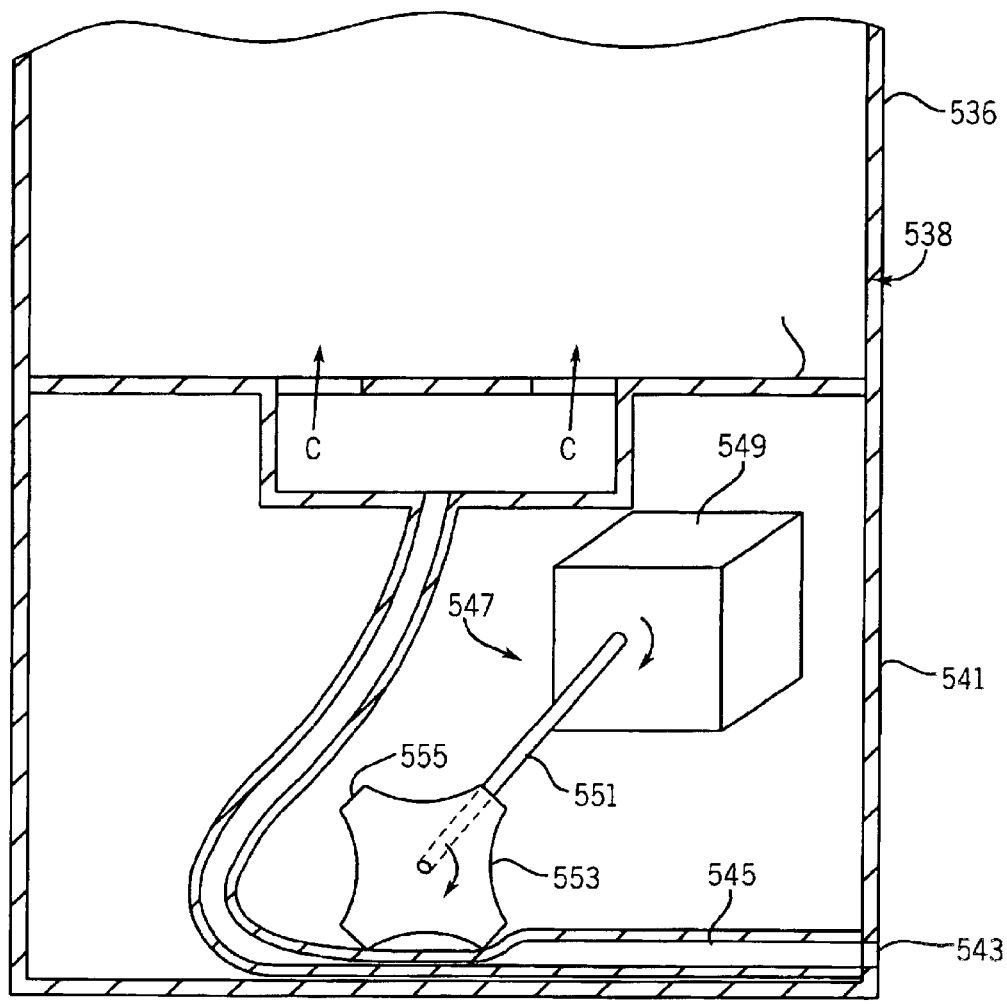
FIG. 12 depicts a more detailed view of the air mover chamber of the cartridge of FIG. 11.

While the air circulation device 50 described above is a fan, it should be appreciated that other devices could be used. For example, referring now to FIGS. 11 and 12, a cartridge 538 is provided in accordance with an alternate embodiment of the present invention. In particular, air mover chamber 541 is separated from the "figure-8" battery housing 536 by a perforated separator 547 that allows air to flow between an air circulation device 547 and the cells 540, as schematically illustrated by Arrow C. It should be appreciated that the air may flow in accordance with any of the embodiments described below.

An air inlet in the form of an aperture 543 to the exterior of the battery housing 536 is connected to the interior of the air mover chamber 541 by flexible tubing 545. The tubing 545 is sized to provide a suitable amount of air for operation of the zinc-air cells 540 and the amount of such air depends upon the capacity of the cells and is known to those skilled in the art. The intake of air is regulated by a peristaltic pump 547 which itself comprises a pump motor 549 attached to a pump spindle 551 and a rotating pump head 553 at a distal location on the spindle relative to the pump motor. In operation, the motor 549 drives the spindle 551 and the pump head 553 to compress the tubing 545 for transferring the correct amount of air into the cell chamber(s). This prevents continuous exposure of the cell(s) 40 to ambient air for extended and intermittent use. The motor 549 could have a gear that engages a larger gear of the spindle 551 to decrease the rotational speed of the pump head, if desired.

The pump head 553 has a plurality of protrusions 555 (4 as illustrated) such that when the pump 547 is in operation, the protrusions compress and release the tubing 545 to form discrete air packages. It should be appreciated that any suitable number (e.g., 3–8) of protrusions could extend from pump head 553. When the pump 547 is not operating, the pump head 553 constricts the flexible tubing 545 such that no air or air insufficient to promote evaporation of the electrolyte is introduced into the air mover chamber 541. In accordance with an alternate embodiment illustrated in FIG. 13, the spindle 551 turns the pump head 553 which includes protrusions at the vertices of an equilateral triangle and having rollers 557 that compress the air within tubing 545 to deliver air packets to the cells 540.

In this regard, it should be appreciated that the peristaltic pump 547 may provide a unitary airflow, such as is provided in conventional air managers whereby all air circulated by device 547 passes over the cell(s) 540 and exits the battery housing 536 via an outlet diffusion tube (not shown) as would be understood by a skilled artisan. Because pump 547 is capable of providing a relatively low supply of air, if desired, this embodiment is suitable for an air manager in combination with metal-air cells installed in an electronic device that demands low levels of current. The low supply of air would ensure that the cells 540 do not dry out prematurely. Furthermore, when no current is needed, the tubing 545 would be crimped, thereby greatly limiting the air supply to the cells and prolonging their lives. Alternatively, an air manager using the peristaltic pump 547 could operate the pump at a speed sufficient to enable its use in a cartridge as described above having a split air flow design, in which one portion of the air induces air flow into the battery compartment, while the other portion flows to the cells.

Figure 13:
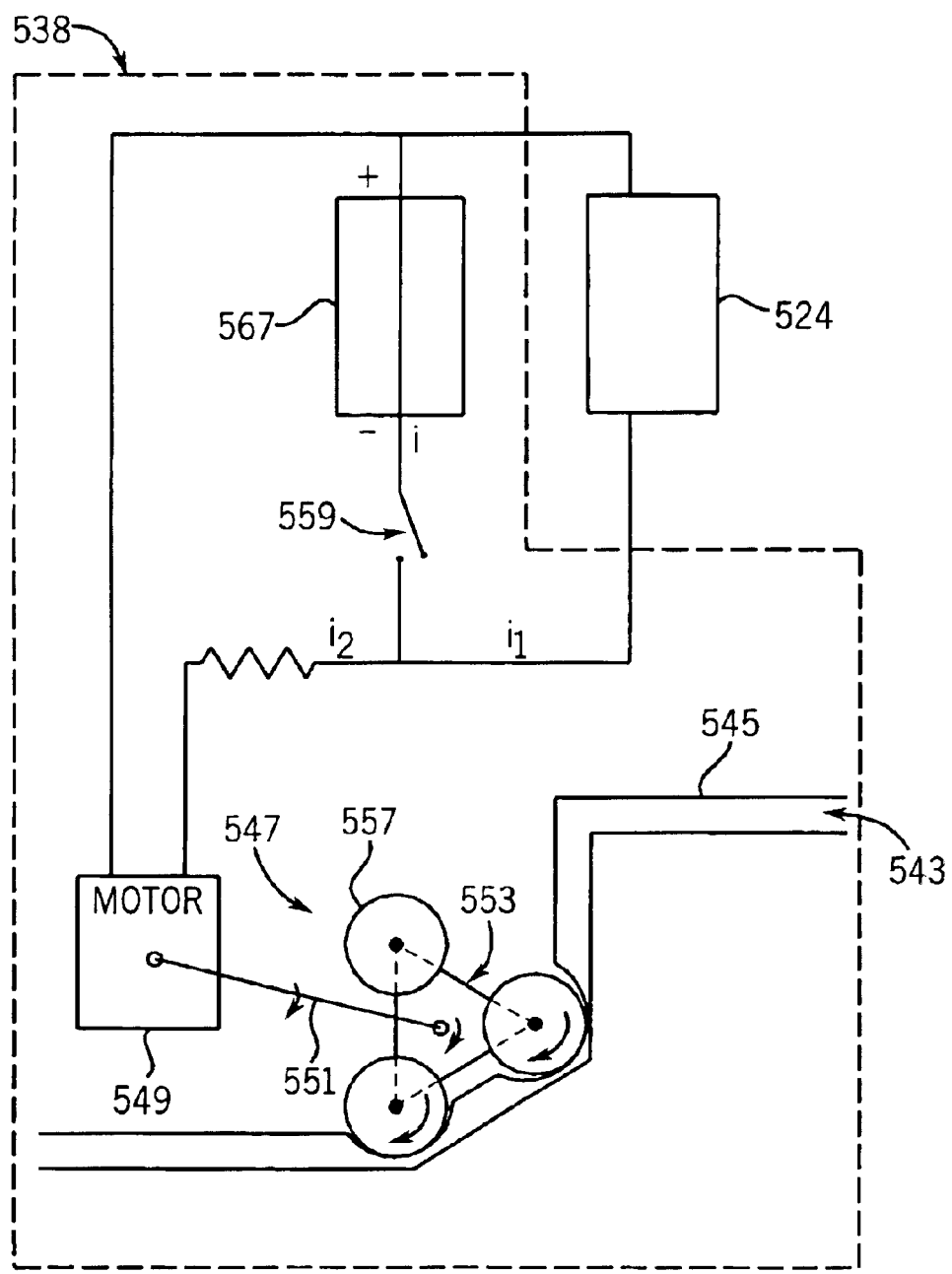
FIG. 13 depicts an embodiment of the electrical connections for operating the battery cartridge of the invention along with an alternative embodiment of the air inlet regulator.

As illustrated in FIG. 13, it is preferred that the cells 540 that operate the electronic device also operate the pump motor 549. In particular, when the switch 559 is closed, current flows to the electronic device and to the motor, thus ensuring air intake only when the device is in operation. Alternatively, a separate battery activated by the user could initiate operation of the air pump in the battery cartridge (or fan 50), although this is less preferred because it introduces the possibility that the air intake will be inadvertently continued even without operation of the electronic device. Furthermore, if desired, the peristaltic air pump 547 could replace fan 550, and be controlled by the control circuitry 456 illustrated in FIG. 6.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

We claim:

1. A battery configured to be installed in a battery compartment of an electrical device, wherein the battery includes at least one air-depolarized cell to supply power to the device, the battery comprising:
    a housing that defines a cell cavity containing the cell, the housing including:
        i. a bypass airflow conduit extending through the housing and isolated from the cell;
        ii. a second conduit defined by a gap between the cell and the cell cavity; and
        iii. a housing inlet in fluid communication with the bypass airflow conduit and the second conduit; and
    an air manager having an air mover configured to supply air to the inlet, wherein a first portion of the air travels along the bypass airflow conduit to stimulate air flow within the battery compartment, and wherein a second portion of the air travels along the second conduit to deliver oxygen to the cell.

2. The battery as recited in claim 1, wherein the air mover receives air from the battery compartment, and outputs the received air into the housing inlet.

3. The battery as recited in claim 1, wherein the first and second portions of air are exhausted from the housing and flow into the battery compartment via a housing outlet.

4. The battery as recited in claim 3, wherein a first portion of the exhaust air exits the battery compartment, and wherein a second part of the exhaust air is re-circulated to the air mover.

5. The battery as recited in claim 1, wherein the air mover operates at variable speeds.

6. The battery as recited in claim 1, wherein the housing further comprises a pair of adjacent cylindrical cell cavities having a "figure-8" cross sectional configuration, and wherein the bypass airflow conduit is centrally disposed between the cavities.

7. The battery as recited in claim 1, wherein the cell cavity is sized to receive at least one of a AA, AAA, AAAA, C, and D sized cell.

8. The battery as recited in claim 1, wherein the cell is a zinc-air cell.

9. The battery as recited in claim 1, wherein the first portion of air and the second portion of air exit the cell cavity via an outlet diffusion tube that extends between the bypass airflow conduit and the battery compartment.

10. The battery as recited in claim 1, wherein the first portion of air exits the bypass airflow conduit into the battery compartment, and wherein the second portion of air exits the second conduit into the battery compartment via an outlet diffusion tube that extends between the second conduit and the battery compartment.

11. The battery as recited in claim 1, wherein an inlet into the bypass airflow conduit is displaced axially downstream from the housing inlet.

12. The battery as recited in claim 1, further comprising an inlet diffusion tube extending between the air mover and the second conduit, wherein the second portion of air travels from the air mover to the second conduit via the inlet diffusion tube.

13. The battery as recited in claim 1, wherein the air mover is disposed in a chamber that is removably connected to the housing.

14. The battery as recited in claim 13, wherein the air mover comprises:
- a flexible tubing extending between an inlet of the chamber and the housing inlet;
- a rotatable pump head having protrusions extending therefrom configured to compress and subsequently depress the flexible tubing; and
- a pump motor operable to rotate the pump head to drive air through the tubing and into the housing inlet.

15. The battery as recited in claim 1, wherein the air mover comprises a fan.

16. The battery as recited in claim 1, the housing containing a second cell, wherein the bypass airflow conduit is defined by an elongated space between the cells.

17. The battery as recited in claim 1, the housing containing a second cell, wherein the bypass airflow conduit is defined by a cylindrical wall extending between the cells.

18. A battery configured to be installed in a battery compartment of an electrical device having at least one air-depolarized cell to supply power to the device, the battery comprising:
- a battery housing that defines a cell cavity containing the cell;
- a housing inlet;
- a housing outlet;
- a first flow path extending axially through the housing and linking the inlet to the outlet;
- a second flow path separate from the first flow path and defined by a gap between the cell and the cell cavity and linking the inlet to the outlet;
- an air manager having an air mover configured to supply air to the housing inlet, wherein a first portion of the air travels along one of the flow paths to stimulate air flow within the battery compartment, and wherein a second portion of the air travels along the other flow path to deliver oxygen to the cell.

19. The battery as recited in claim 18, wherein the first and second portions of air are exhausted from the housing outlet into the battery compartment.

20. The battery as recited in claim 19, wherein a first portion of the exhaust air is re-circulated within the battery compartment to the air mover, and wherein a second portion of the exhaust air exits the battery compartment.

21. The battery as recited in claim 18, wherein the second flow path is radially offset from the housing inlet, and wherein the second portion of the air travels radially outwardly towards an inlet to the second flow path.

22. The battery as recited in claim 18, wherein a third portion of air travels from the air mover into the battery compartment, without entering the housing inlet, to stimulate air flow within the battery compartment.

23. The battery as recited in claim 18, wherein the air manager is disposed within a chamber that is removably connected to the housing.

24. The battery as recited in claim 18, wherein the air mover is operable at variable speeds.

25. The battery as recited in claim 18, wherein the air mover comprises a fan.

26. The battery as recited in claim 18, wherein the air mover comprises:
- a flexible tubing extending between an inlet of the chamber and the housing inlet;
- a rotatable pump head having protrusions extending therefrom configured to compress and subsequently depress the flexible tubing; and
- a pump motor operable to rotate the pump head to drive air through the tubing and into the housing inlet.

27. The battery as recited in claim 18, wherein the air travels along the first flow path to stimulate air flow within the battery compartment.

28. The battery as recited in claim 18, wherein the air travels along the second flow path to deliver oxygen to the cell.

29. A battery configured to be installed in a battery compartment of an electrical device having at least one air-depolarized cell to supply power to the device, the battery comprising:
- a battery housing that defines a cell cavity containing the cell;
- a housing inlet in communication with a flow path past the cell;
- an air manager compartment including a battery outlet connecting the compartment to a location external with respect to the battery housing, the compartment further including an air mover configured to supply draw air from the battery compartment and supply a first portion of the drawn air to the cell via the flow path; and, and deliver a second portion of air to the battery outlet without entering the housing inlet.

30. The battery as recited in claim 29, wherein the battery housing further includes a battery housing outlet to the battery compartment, and wherein some of the first portion of air travels directly from the inlet to the housing outlet, and wherein other of the first portion of air travels from the inlet to the cell.

31. The battery as recited in claim 29, wherein the second flow of air stimulates air flow within the battery compartment.

32. An air-depolarized cell battery comprising:
- a battery housing defining a cell cavity containing an air depolarized cell, the housing having an inlet end;
- a conduit in fluid communication with the inlet end for delivering air to the cell; and
- an air manager operable to supply air to the inlet end, the air manager including:
  i. an air manager chamber connectable to the battery, the chamber defining an inlet end and an outlet end that is in fluid communication with the housing inlet; and
  ii. a peristaltic air pump disposed within the housing, the air pump including:
    (a) flexible tubing extending between the housing inlet of the chamber and the housing inlet;
    (b) a rotatable pump head having a plurality of protrusions extending therefrom sized to compress and subsequently depress the flexible tubing; and
    (c) a pump motor operable to rotate the pump head to drive air from the chamber inlet, through the tubing, and into the housing inlet.

33. The battery as recited in claim 32, wherein the pump head further comprises three protrusions having tips that define an equilateral triangle.

34. The battery as recited in claim 32, wherein the protrusions comprise rollers that rotate along the tubing as the pump head is rotated.

35. The battery as recited in claim 32, wherein four protrusions extend from the pump head and engage the tubing.

36. The battery as recited in claim 32, wherein air pockets are formed between adjacent protrusions that engage the tubing, and wherein the air pockets are delivered to the inlet end.

37. A method for operating an air-depolarized cell battery of the type having an air inlet, an air outlet, a cavity containing a metal air cell, and an air mover operable to deliver air to the inlet, wherein the battery is disposed within a battery compartment, the steps comprising:
- (A) delivering air from the battery compartment to the air inlet via the air mover;
- (B) delivering a first portion of the air from the inlet to the outlet via a first flow path without engaging the cell to stimulate air flow through the battery compartment;
- (C) delivering a second portion of the air from the inlet to a second flow path that delivers the second portion of the air to the cell; and
- (D) directing the first and second portions of the air through the outlet as exhaust air.

38. The method as recited in claim 37, the steps further comprising:
- (E) re-circulating a first portion of the exhaust air through the battery compartment to the air mover; and
- (F) directing a second portion of the exhaust air out the battery compartment.

39. The method as recited in claim 37, wherein the first flow path extends axially through the cell linking the inlet and the outlet.

40. The method as recited in claim 37, wherein the battery responds to an electrical demand from an electrical device to supply current therefrom, and wherein step (A) further comprises:
sensing the electrical demand and operating the air mover at a speed suitable to deliver a requisite amount of oxygen to the cell to meet the electrical demand.

41. The method as recited in claim 40, wherein the requisite amount of oxygen is sufficient to meet an electrical demand of the air mover.

42. The method as recited in claim 37, wherein the second flow path is defined by a gap between the cell and the battery compartment.

43. In an electrical device having (1) a load that draws current from a battery source, and (2) walls defining a battery compartment configured to accept an alkaline battery and having terminals that are electrically connected to the load, the improvement comprising:
a battery cartridge adapted in shape to fit into the battery compartment while maintaining electrical communication with the load, the cartridge including:
- (i) a battery housing having an inlet end and an outlet end and encasing a pair of air-depolarized cells arranged in a side-by-side orientation and connected at an interface;
- (ii) a conduit extending through the interface and connecting the inlet end to the outlet end
- (iii) an air mover chamber positioned at the inlet end and operable to supply air to conduit and the cells when current is drawn by the load; and
- (iv) positive and negative terminals operable to engage the terminals of the battery compartment.

44. The cartridge as recited in claim 43, wherein the cells are disposed in cell compartments having a "Figure-8" cross sectional orientation.

45. The cartridge as recited in claim 43 having a size and shape of a pair of adjacent standard AA, AAA, AAAA, C, and D sized alkaline cell.

46. The cartridge as recited in claim 43, wherein the conduit is isolated from the cells, further comprising a second conduit configured to supply air to the cells, wherein the air mover chamber further comprises an air mover operable to supply air to the conduits.

47. In combination,
an electrical device defining an openable battery compartment;
the battery compartment including a battery cartridge having an inlet end and an outlet end and containing at least one metal-air cell, the cartridge including a first flow path delivering air from the inlet to the cell and a second flow path delivering air from the inlet to the outlet without engaging the cell to stimulate airflow through the cartridge, wherein the compartment, when closed, is incapable, in the absence of an operating air moving device, of admitting sufficient air to support in excess of 0.045 watts per square centimeter of air electrode area from a metal-air battery;
an air depolarized power source including one or more air depolarized cells each including an air electrode in the battery cartridge; and
an air mover in the battery cartridge operable to direct air into the inlet;
the air mover being positioned to direct air to the air electrode and to draw into the battery compartment, when closed, sufficient air to support output from the power source of at least 0.045 watts per square centimeter of air electrode area.

48. A battery configured to be installed in a battery compartment of an electrical device having at least one air-depolarized cell to supply power to the device, the battery comprising:
a battery housing that defines a cell cavity containing the cell;
a housing inlet receiving supply air;
a first flow path defined by a gap between the cell and the cell cavity in communication with the inlet, the first flow path receiving a first portion of the supply air to deliver oxygen to the cell;
a second flow path extending between the housing inlet and the housing outlet receiving a second portion of the supply air to stimulate air flow within the battery compartment;
a housing outlet receiving air from the first and second flow paths and outputting exhaust air, a first portion of the exhaust air exiting the battery compartment, and a second portion of the exhaust air being re-circulated towards the housing inlet; and
an air manager having an air mover configured to receive and direct the supply air to the housing inlet, wherein the supply air includes re-circulated exhaust air.

49. The battery as recited in claim 48, wherein the first and second portions of air are exhausted from the housing outlet into the battery compartment.

50. The battery as recited in claim 48, wherein the first flow path is radially offset from the housing inlet, and wherein the second portion of the air travels radially outwardly towards an inlet to the first flow path.

51. The battery as recited in claim 48, wherein a third portion of air travels from the air mover into the battery compartment, without entering the housing inlet, to stimulate air flow within the battery compartment.

52. The battery as recited in claim 48, wherein the air manager is disposed within a chamber that is removably connected to the housing.

53. The battery as recited in claim 48, wherein the air mover is operable at variable speeds.

54. The battery as recited in claim 48, wherein the air mover comprises a fan.

55. The battery as recited in claim 48, wherein the air mover comprises:

a flexible tubing extending between an inlet of the chamber and the housing inlet;

a rotatable pump head having protrusions extending therefrom configured to compress and subsequently depress the flexible tubing; and a pump motor operable to rotate the pump head to drive air through the tubing and into the housing inlet.

* * * * *